United States Patent [19]

Bruner et al.

[11] Patent Number: 6,061,751
[45] Date of Patent: May 9, 2000

[54] COMPUTER SYSTEM WITH CONTROLLER CIRCUIT OF AN ASSOCIATED MASS STORAGE PERIPHERAL DEVICE LOCATED REMOTELY FROM THE DEVICE IN THE HOST COMPUTER

[75] Inventors: Curtis H. Bruner, Niwot; Tracy D. Harmer, Longmont, both of Colo.

[73] Assignee: Texas Instruments Incorporated, Dallas, Tex.

[21] Appl. No.: 09/037,812

[22] Filed: Mar. 9, 1998

[51] Int. Cl.$^7$ .............................. G06F 13/38; G06F 13/10
[52] U.S. Cl. .............................. 710/74; 710/65; 710/129; 711/112; 709/301
[58] Field of Search ................................ 710/65, 74, 129; 711/112; 709/301

[56] References Cited

U.S. PATENT DOCUMENTS

| | | | |
|---|---|---|---|
| 5,016,121 | 5/1991 | Peddle et al. | 360/39 |
| 5,058,004 | 10/1991 | Ravid | 710/2 |
| 5,150,465 | 9/1992 | Bush et al. | 710/14 |
| 5,274,773 | 12/1993 | Squires et al. | 710/38 |
| 5,337,414 | 8/1994 | Hashemi et al. | 710/52 |
| 5,581,715 | 12/1996 | Verinsky et al. | 710/129 |
| 5,661,848 | 8/1997 | Bonke et al. | 711/112 |
| 5,685,012 | 11/1997 | Klein | 710/14 |
| 5,832,418 | 11/1998 | Meyer | 702/119 |
| 5,835,760 | 11/1998 | Harmer | 713/2 |
| 5,867,733 | 2/1999 | Meyer | 711/112 |
| 5,875,349 | 2/1999 | Cornaby et al. | 710/5 |

*Primary Examiner*—Thomas C. Lee
*Assistant Examiner*—Albert Wang
*Attorney, Agent, or Firm*—W. Daniel Swayze, Jr.; Wade James Brady, III; Frederick J. Teleckey, Jr.

[57] ABSTRACT

A computer system has a host computer and a mass storage peripheral device. The peripheral device is of the type having a computer readable medium, a sensor for detecting information on the medium, and a data amplifier for amplifying the information detected on the medium to produce an amplified data signal. An interface is provided between the mass storage peripheral device and the host computer. The computer system electronics is located wherein at least a controller circuit for the mass storage peripheral device is located in the host computer for receiving the information detected on the medium. The peripheral device may be, for example, a disk drive assembly, a hard disk drive assembly, a CD-ROM disk drive assembly, a DVD disk drive assembly, a floppy disk drive assembly, a high capacity floppy disk drive assembly, a miniature storage device, or the like. The mass storage peripheral device may be of the type that has a motor for rotating the medium, in which case, the servo circuitry may be located on the peripheral device, split between the peripheral device and host computer, or preferably, entirely contained in the host computer.

51 Claims, 4 Drawing Sheets

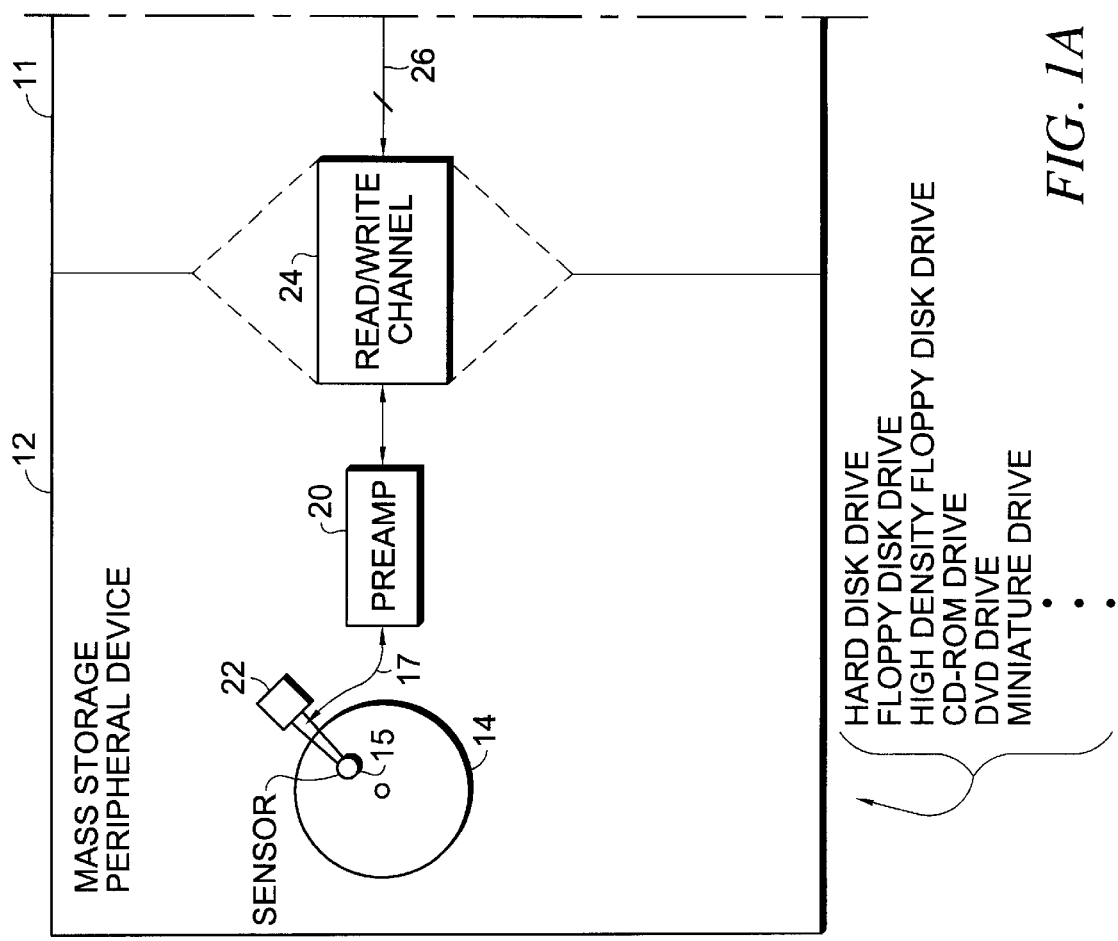

COMPUTER SYSTEM WITH CONTROLLER CIRCUIT OF AN ASSOCIATED MASS STORAGE PERIPHERAL DEVICE LOCATED REMOTELY FROM THE DEVICE IN THE HOST COMPUTER

BACKGROUND OF THE INVENTION

1. Field of the Invention

This invention relates to improvements in computer systems, and more particularly to improvements in computer systems to enable operating circuitry and programs of a mass storage peripheral device to be located remotely from the device.

2. Relevant Background

Mass storage peripheral devices have played a large part in the development of modern computers. Typical mass storage devices include hard and floppy disk drives, CD-ROM drives, DVD devices, and the like.

A typical mass storage peripheral device that may be associated with a computer has various electronic circuits for the operation of the device that are configured so that the device may be used as universally as possible with various processor or computer configurations. Typically, for example, a mass storage peripheral device is constructed with a spinning data medium on which data is at least read, and often times to which data may be written. Such devices also generally include a motor for spinning the medium, and one or more head devices that are movable to selectable locations on the medium to read and record data from the medium. Associated electronic circuitry is often provided on a printed circuit board that is provided in an assembly with the spinning medium to control the rotation of the motor and the selective positioning of the heads.

Particular electronic circuits that may be provided with any particular mass storage device may vary depending upon the type and kind of peripheral device considered. Typical electronic circuitry, for example, for a hard disk drive (HDD) assembly may include a servo or motor control circuit for spinning the motor,-voice coil control circuitry for positioning the data heads, data preamplifier circuitry for amplifying the signals read by the heads from the spinning medium, read channel processing circuitry for initial processing of the read data, and controller circuitry. The controller circuitry may include buffer memory elements for speed matching and signal timing, signal interfacing circuitry for interfacing the data and other signals to the computer bus and control circuits, error correction and control circuitry, and so on. Such circuitry is generally provided in a number of integrated circuit devices, perhaps contained in as many as nine separate integrated circuit chips, mounted on the printed circuit board that is associated with the particular peripheral device.

The hard disk drive electronics is typically connected by one or more buses to corresponding buses on the "mother board" of the host computer. The mother board may have its own supporting electronics for such peripheral devices, such as line driver circuitry and data processing circuitry to route and control the various signals provided to and from the peripheral device.

Because each particular mass storage peripheral device may have its own particular hardware and software characteristics that may be unique to it, typically, mass storage devices may also be required to include their own customized firmware that enable the associated computer to be properly initialized to address and access the data of the device. Among other things, such firmware may include such information as to how addresses are translated from the computer to the particular arrangement of the mass storage device, such as the cylinder, head, sector, zone, of the device, and so on. Such peripheral devices are supplied with custom firmware that is generally loaded upon initialization of the associated computer into the system RAM.

In most cases, software drivers also may be required. Such software drivers may be provided by generic drivers, often supplied with the computer operating system software, and in other cases, the drivers may be separately provided by the manufacturer of the particular peripheral device, particularly when the particular peripheral device has special or unusual characteristics. Therefore, it can be seen that there are limitations on the variations, particularly on the hardware, that may be provided on any peripheral device, as they must be compatible with existing computer hardware architectures and designs.

As speed of data access increases, hardware and software techniques have been developed to speed up data transfers to and from such mass storage devices. One such technique that is becoming popular is the provision of a Peripheral Component Interconnect (PCI) bus. In addition to providing increased access speed to the data of the peripheral device, the PCI bus is designed to be both processor and computer system architecture independent, with the PCI electrical, protocol, and hardware interface requirements remaining the same regardless of the CPU or host system computer architecture being used. This allows the same peripheral computer device to be connected to a variety different of host systems without requiring different versions of the device for each type of host system with which the device is intended to be used.

PCI bus architecture also allows relocatable expansion ROM location addresses on associated peripheral devices. For additional details of PCI bus characteristics in the context of mass storage peripheral devices, reference is made to PCT application number WO 97/18505, entitled "METHOD AND ARRANGEMENT FOR OPERATING A MASS MEMORY STORAGE PERIPHERAL COMPUTER DEVICE CONNECTED TO A HOST COMPUTER", said application being assigned to the assignee hereof, and incorporated herein by reference.

In addition, mass memory storage peripheral devices may include customized expansion BIOS data that is loaded into the system RAM on initialization of the associated computer. Details of particular BIOS techniques are described in PCT application number WO 97/14095, entitled "SYSTEM FOR PROVIDING BIOS TO HOST COMPUTER", said application being assigned to the assignee hereof and incorporated herein by reference.

One of the goals of mass storage peripheral device manufacturers is to reduce the cost of the devices as much as possible. This has been addressed primarily by increasing levels of electronics integration in concert with decreasing integrated circuit costs for a given function due to decreasing semiconductor geometries. These reductions, however, have not been predominately at the system level. It can be seen that using this approach the required electronic and hardware requirements simiar to a PCI bus.

SUMMARY OF THE INVENTION

Therefore, in light of the above, it is an object of the invention to provide an improved computer system that enables the operating circuitry and programs of a mass storage peripheral device associated with the computer to be located in the host computer.

It is another object of the invention to provide an improved computer system of the type described in which a single integrated circuit is provided for controlling at least some of the functions of an associated mass storage peripheral device, located in the host computer, for example, on the mother board of the computer.

It is another object of the invention to provide an improved computer system of the type described in which a single integrated circuit designed for use with a bus mastering bus, such as a PCI bus, or the like, for controlling an associated mass storage peripheral device.

It is yet another object of the invention to provide an improved computer system of the type described in which a single PCI mass storage integrated circuit is provided for controlling more than one associated mass storage peripheral devices.

It is still another object of the invention to provide an improved computer system of the type described that enables the cost of peripheral devices that are associated with the system to be reduced beyond that of devices presently used that include the required device electronics.

It is another object of the invention to provide a computer system that relaxes the design requirements of the computer to accommodate a wide variety of mass storage peripheral devices, without requiring knowledge in advance of specifications and/or physical characteristics of a particular mass storage device.

These and other objects, features and advantages of the invention will be apparent to those skilled in the art from the following detailed description of the invention, when read in conjunction with the accompanying drawings and appended claims.

Thus, according to a broad aspect of the invention, a computer system is presented that has a host computer and a mass storage peripheral device. The peripheral device is of the type having a computer readable medium, a sensor for detecting information on the medium, and a data amplifier for amplifying the information detected on the medium to produce an amplified data signal. An interface is provided between the mass storage peripheral device and the host computer. The computer system electronics is located wherein at least a controller circuit for the mass storage peripheral device is located in the host computer for receiving the information detected on the medium. The controller circuit is of the type that delivers the information onto a bus mastering bus, such as a PCI bus, or a 1394 bus, in the host computer.

The mass storage peripheral device may be, for example, a disk drive assembly, a hard disk drive assembly, a CD-ROM disk drive assembly, a DVD disk drive assembly, a floppy disk drive assembly, a high capacity floppy disk drive assembly, a miniature storage device, or the like. The mass storage peripheral device may be of the type that has a motor for rotating the medium, in which case, the servo circuitry may be located on the peripheral device, split between the peripheral device and host computer, or preferably, entirely contained in the host computer.

The mass storage peripheral device may also have a positioning mechanism for positioning the sensor. The computer system may then include a circuit, preferably located in the host computer, connected to the interface for operating the positioning mechanism.

The read channel circuitry which is connected to receive the amplified data signal also may be located on the peripheral device, divided with portions on the peripheral device and the host computer, or may be contained entirely in the host device.

According to another broad aspect of the invention, a computer system is presented that has a host computer and a plurality of associated mass storage peripheral devices. At least some of the peripheral devices may be of the type that has a computer readable medium, a sensor for detecting information on the medium, and a data amplifier for amplifying the information detected on the medium to produce an amplified data signal. An interface is provided between the mass storage peripheral devices and the host computer, and at least one controller circuit is provided for the mass storage peripheral devices in the host computer for receiving the information detected on the media of the devices for use in the computer. The controller may include a plurality of controller circuits, each for respective associated ones of the plurality of mass storage peripheral devices.

According to yet another broad aspect of the invention, a computer system is presented that includes a mass storage peripheral device of the type having a rotatable computer readable data medium, a motor for rotating the medium, a sensor for detecting information on the medium, and a data amplifier for amplifying the information detected on the medium. A circuit board is provided for containing circuitry for controlling the operation of a computer. An interface is provided between the mass storage peripheral device and the circuit board, and a controller circuit is located on the circuit board for receiving data signals directly from the data amplifier for use in the computer. A servo circuit is also located on the circuit for driving the motor.

BRIEF DESCRIPTION OF THE DRAWINGS

The invention is illustrated in the accompanying drawings, in which:

FIGS. 1, 1A, and 1B show a box diagram of a data processing path of a computer system having a host computer and a mass storage peripheral device, showing the configuration and location of parts, according to a preferred embodiment of the invention.

In the various figures of the drawing, like reference numerals are used to denote like or similar parts.

DETAILED DESCRIPTION OF THE PREFERRED EMBODIMENTS

The objects of the invention are addressed, as below described in detail, by the construction and arrangement of a mass storage peripheral device and its associated host computer. "Host computer" is used herein to designate any device with which a mass storage device may be operatively associated that has a central processing unit (CPU), a memory, and a bus mastering bus. A bus mastering bus is a bus in which a device is enabled to make a memory access request without requiring intervention or involvement with the CPU, and may be located on a circuit board, or "motherboard", may be contained within an integrated circuit chip, for example, the CPU chip, cabled, or elsewhere. Examples of suitable bus mastering buses are the PCI bus or the 1394 bus, which are well known. (PCI is the acronym for Peripheral Computer Interconnect. PCI is a high speed, high bandwidth, 32/64 bit, 33/66 MHz, processor independent expansion bus.) It should be understood, however, that any suitable bus mastering bus may be used.

Briefly, the invention is realized by locating many of the operating circuitry, programs, firmware in the host computer that classically were located on a circuit board of the peripheral device. Thus, for example, the controller for the mass storage peripheral device is located in the host computer, such as on the motherboard. Additional circuitry may also be located in the host computer, including the servo circuits to spin the motor of the peripheral device, and the voice coil actuating circuitry to position the data sensor of the peripheral device. As a consequence, the quantity and expense of electronic circuits traditionally located on the peripheral device are removed from and remotely located from the device. This has the effect of lowering the overall cost of the particular mass storage peripheral device to which the invention pertains. This also allows for a reduction in overall part count.

Figure 1B:
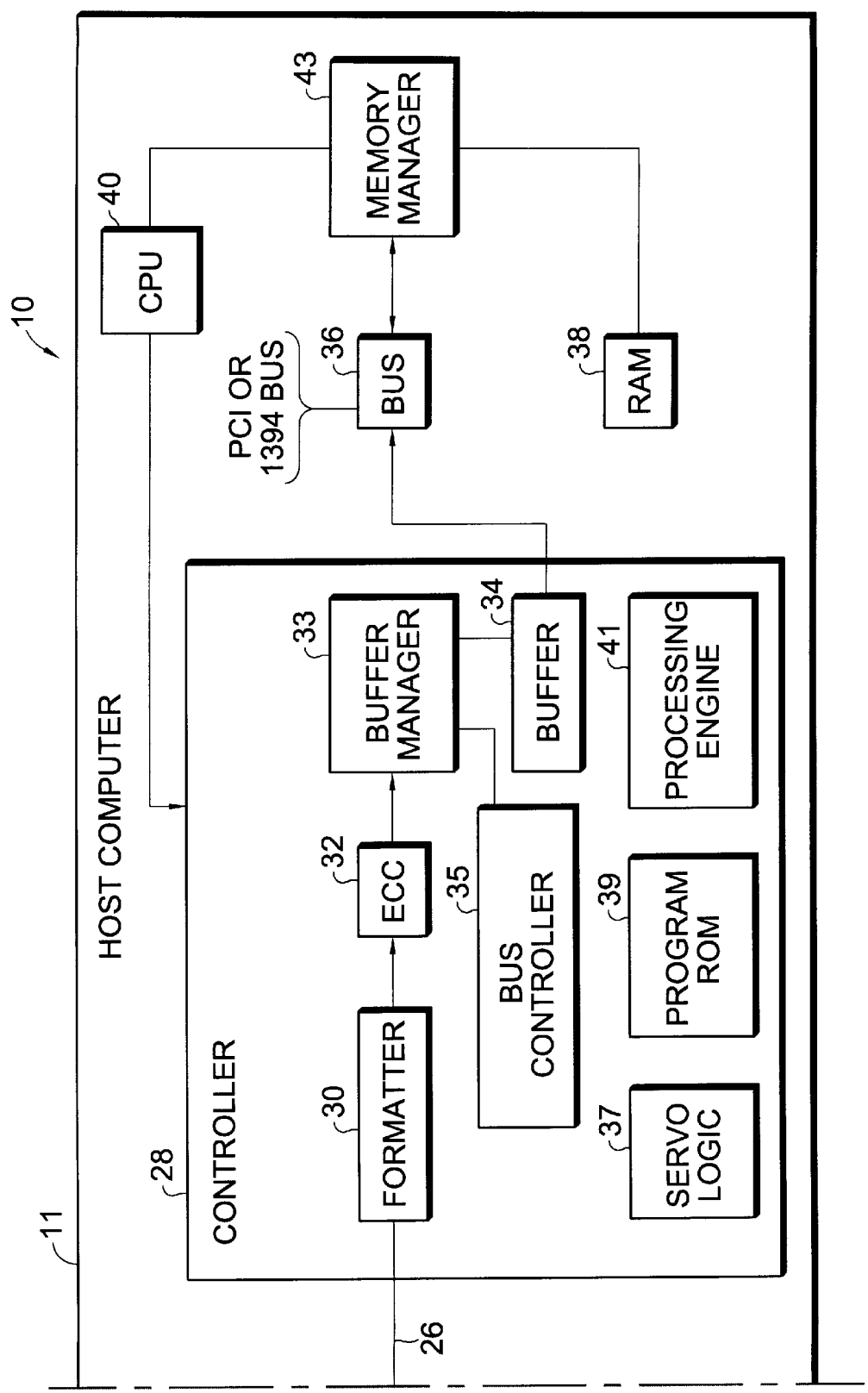

A block diagram of a data processing path of a computer system 10 having a host computer 11 and a mass storage peripheral device 12 is shown in FIG. 1, showing the configuration and location of parts, according to a preferred embodiment of the invention. The mass storage peripheral device includes a data media 14 and a sensor 15 for at least reading data from the media 14. As will be apparent to those skilled in the art, the physical form of the data media and sensor will depend upon the particular type of device considered. For example, it is envisioned that the principles of the invention will be applicable to such mass storage peripheral devices as hard disk drives, floppy disk drives, high density floppy disk drives, CD-ROM drives, DVD drives, miniature drives, and other such drives.

Typically, the signals detected by the sensor 15 are conducted by a "flex cable" 17 to a preamplifier 20. The preamplifier 20 may be constructed on the flex cable 17, or it may be separate therefrom. The sensor 15 is positioned by a positioning mechanism 22 to selectable locations on the data media 14, in a known manner.

The output of the preamplifier is connected to read/write channel circuitry 24, which, as indicated by dotted lines, may be contained wholly in the mass storage peripheral device 12, wholly in the host computer 11, or partially within each, as discussed in greater detail below. The read/write channel performs various functions on the amplified analog data read by the heads 15, such as filtering, analog-to-digital conversion in the respective read and write paths, automatic gain control, pulse detection, encoding/decoding for read/ write functions, and so forth. The output from the read/write channel on line 26 is raw digital data, which is conducted to the peripheral device controller 28.

In a read mode, the controller 28 receives the raw digital data on line 26 and formats it in a formatter or sequencer circuit 30. The formatted data is then error corrected in an error correction and control circuit (ECC) 32, and then buffered in a second buffer 34, under the control of a buffer manager 33. The function of the ECC circuit 32 is to use an error correction portion of the data read to ensure that the intended data is properly read. In a write mode, the functions are the same, but in reverse order. The ECC circuit 32 in a reverse path generates error correction data and appends it to the data written to the media 14. According to a preferred embodiment of the invention, the entire controller is located in the host computer 11, for example, on an integrated circuit on the motherboard thereof. The controller 28 also typically includes a bus controller circuit 35, servo logic 37, a program ROM 39, and a processing engine 41, as shown.

The output from the controller 28 is connected to a bus mastering type bus 36, discussed above, from which it is written or read into a memory, such as RAM 38 under the control of a memory manager 43. As discussed above, although a CPU 40 is included as a part of the host computer 11, it does not necessarily take part in controlling or directing the transfer of data to and from the memory 38.

Figure 2:
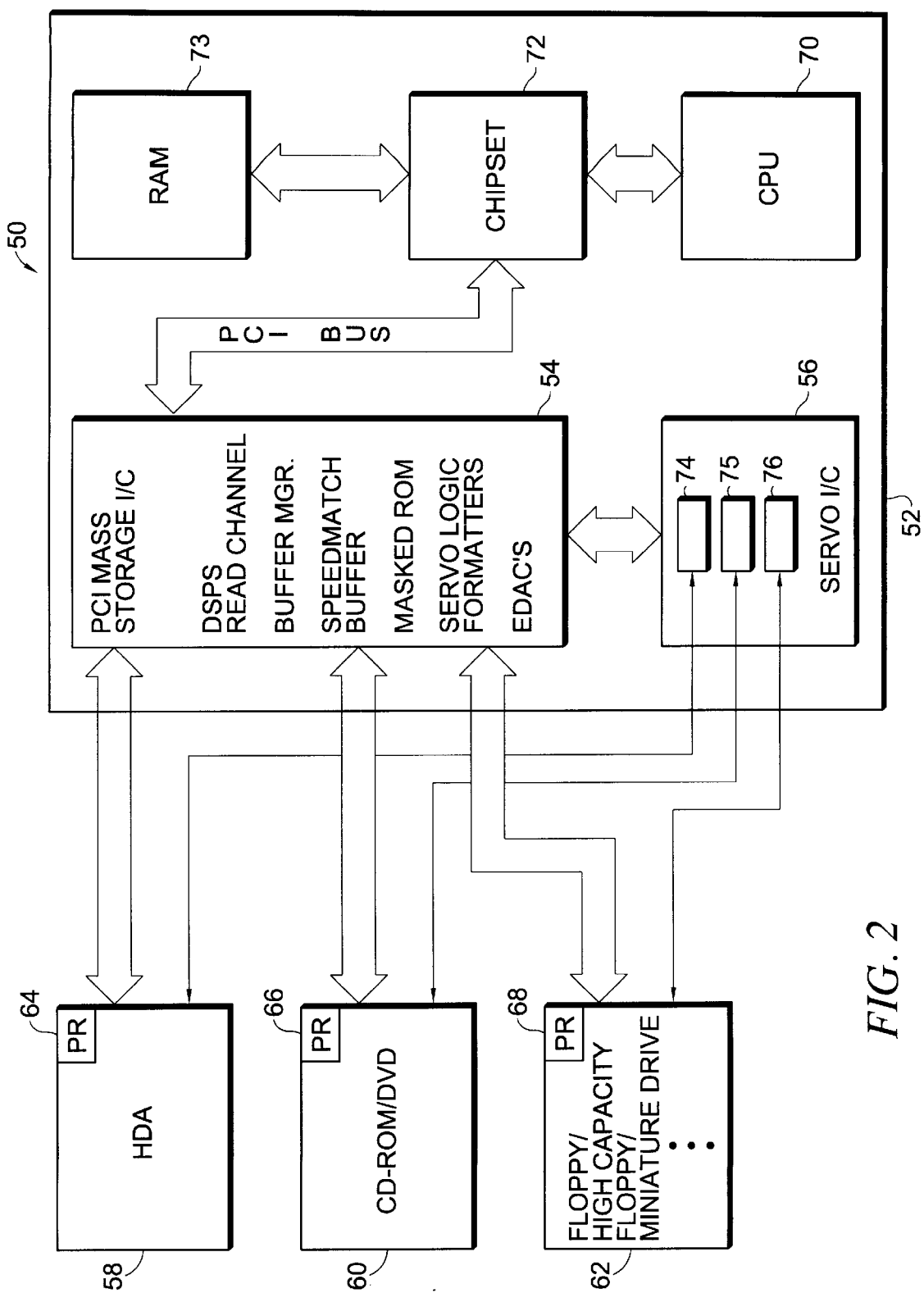
FIG. 2 is a block diagram of a computer system in which most of the electronics to support mass storage peripheral devices are placed on a circuit board of a host computer, in accordance with a preferred embodiment of the invention.

Preferably, most of the electronics necessary for the operation of a mass storage peripheral device is located on the motherboard of a host computer, as shown in FIG. 2. Thus, a computer system 50 includes a circuit board 52, such as the motherboard of a host computer. Also, preferably, the controller and other electronics may be included in a single integrated circuit 54, with the servo signals to spin the motors of the peripheral devices being located in a second single integrated circuit 56. Associated with the computer system 50 are three mass exemplar storage peripherals 58, 60, an 62, as shown. Mass storage peripheral device 58, in the embodiment shown, is a hard drive assembly (HDA). An HDA is a portion of a typical hard disk drive (HDD).

As will be understood, with the controller, servo, and other electronics placed on the motherboard 52, the only necessary components of the drive are the data media, a motor to spin the media, a sensor or head mechanism to read or write data to the media, a preamplifier to amplify the data read from or to be written to the media, and a case to house the parts. This minimum version of the HDD is referred to herein as an HDA. It will be readily appreciated that the cost of an HDA will be significantly less than that of a typical HDD of comparable capacity. Mass storage peripheral device 60, in the embodiment shown, may be a CD-ROM or digital video device (DVD). Finally, mass storage peripheral device 62, in the embodiment shown, may be a floppy drive, a high capacity floppy drive, a miniature drive, or other suitable device.

Each peripheral device 58, 60, and 62 may also have a respectively associated "personality ROM" 64, 66, and 68. The personality ROMs serve to hold physical data definitions of the characteristics of the particular associated mass storage peripheral device.

More particularly, the circuit board 52 of the host computer includes the PCI mass storage integrated circuit 54, the servo integrated circuit 56, the CPU 70 and its associated CPU chipset 72, and a RAM 73. An example of the chipset and CPU that may be used is a Cyrix "MediaGX" product, in which the "North Bridge" chipset is integrated with a host CPU, although other system arrangements may be used, as well. A bus mastering bus, such as the PCI bus 74 shown, interconnects the chipset 72 to the PCI mass storage integrated circuit 54. It should be noted that although the PCI mass storage I/C 54 is shown as a separate chip, it may be integrated into the chipset 74 provided with any particular computer system.

With specific reference now to the PCI mass storage integrated circuit, a single I/C is provided in the embodiment illustrated that contains the necessary electronics to support the three mass storage peripheral devices 58, 60, and 62 shown. The circuitry includes one or more digital signal processors (DSPs), read channel, buffer managers, speed matching buffers, masked ROM, servo logic, formatting, and error detection and correction (EDAC) circuitry. The specific circuitry contained in the PCI mass storage I/C 54 is known in the art, and the manner by which an integrated circuit containing such circuits may be fabricated is well within the skill in the art, and is not described in further detail herein.

Preferably, as shown, the servo I/C 56 contains all of the servo circuits needed to spin and control the motors of the associated mass storage peripheral devices 58, 60, and 62. As shown, three separate servo circuits 74–76 may be integrated onto a single chip. Alternatively, a single servo circuit may be used. It should be noted that the location of the servo I/C 56 on the motherboard 52 is preferred, the servo circuits may be variously located. For example, the servo circuits may be located on the respective mass storage peripheral devices 58, 60, and 62, although the cost and operational advantages will not be fully realized. Or the servo circuits may be distributed with a portion of the servo circuits located on the motherboard 52 and a portion located on the respective mass storage peripheral devices.

One feature of the mass storage peripheral devices used in conjunction with the circuit arrangement shown in FIG. 2 is the provision of a "personality ROM" 64, 66, and 68, respectively with each mass storage peripheral device 58, 60, and 62. As mentioned, the personality ROMs contain information necessary for the host computer to initialize to run properly, without the necessity of detailed driver software. Characterizing data items that may be included in the personality ROM of the mass storage peripheral devices is set forth in the following table. This table is not intended to be all inclusive; other data items may be included, as well. In addition, the table is set forth as an example only, and is not an absolute requirement. Other arrangements will be apparent to those skilled in the art.

| Offset | Size | Field Name | Description |
| --- | --- | --- | --- |
| 0–1 | 2 | Structure ID | ID number for the current structure definition. The structure described here is defined as structure ID number 0. This allows the firmware to know what structure is being returned from the Mass Storage Device. |
| 2–41 | 40 | Identification String | Vendor / Mass Storage Device Identification String. Left Justified string. Space filled to the right. |
| 42–43 | 2 | Number of Physical Heads | Total number of physical heads in the Mass Storage Device. |
| 44–45 | 2 | Number of Available Heads | Total number of available Physical Heads left active in the Mass Storage Device after the manufacturing process. |
| 46–49 | 4 | Valid Head Flag | Flag for indicating what physical heads are active and available. This must be set to the number of valid heads left after the manufacturing process and must be used to indicate if any head de-allocation has being done. Least Significant bit is for head 0, Most Significant bit is for head 32. A value of 1 indicates that the head is available. |
| 50–51 | 2 | Number of Accessible Physical Cylinders | Total number of Accessible Physical Read / Write cylinders in the Mass Storage Device. The first cylinder may start at any positive (i.e. >= 0) cylinder number. |
| 52–53 | 2 | Starting Cylinder of the Expansion BIOS Data Area | The starting physical cylinder for the Expansion BIOS Data Area. The starting location of a contiguous area on the Mass Storage Device media with no breaks or holes allowed. |
| 54–55 | 2 | Number of Expansion BIOS Area Cylinders | Total number of physical cylinders in the Expansion BIOS Data Area. |
| 56–57 | 2 | Starting Cylinder of the Utility Data Area | The starting physical cylinder for the Utility Data Area. The starting location of a contiguous area on the Mass Storage Device media with no breaks or holes allowed. |
| 58–59 | 2 | Number of Utility Data Area Cylinders | Total number of physical cylinders in the Utility Data Area. |
| 60–61 | 2 | Starting Cylinder of the User Data Area | The starting physical cylinder for the User Data Area. This area may be broken up by and contain within it one of the following data areas: Expansion BIOS Data Area Utility Data Area Grown Defects Area If one, two or all of these areas are contained within the User Data Area, the Number of User Data Area Cylinders does not include the cylinders of these area. User Data Area Cylinders are defined to stop counting on the cylinder prior to one of these areas and start counting immediately after one of these |

-continued

| Offset | Size | Field Name | Description |
|---|---|---|---|
| | | | areas. Two or more of the above areas may be grouped together into one large break of the User Data Area. The firmware shall recognize the break and adjust the logical to physical translation for reading and writing user data appropriately. |
| 62–63 | 2 | Number of User Data Area Cylinders | Total number of physical cylinders in the User Data Area. |
| 64–65 | 2 | Starting Cylinder of the Slipped Defects Area | The starting physical cylinder for the Slipped Defects Area. This area must physically follow after the last User Data Area cylinder. |
| 66–67 | 2 | Number of Siipped Defects Area Cylinders | Total number of physical cylinders in the Slipped Defects Area |
| 68–69 | 2 | Starting Cylinder of the Grown Defects Area | The starting physical cylinder for the Grown Defects Area. The starting location of a contiguous area on the Mass Storage Device media with no breaks or holes allowed. |
| 70–71 | 2 | Number of Grown Defects Area Cylinders | Total number of physical cylinders in the Grown Defects Area |
| 72–73 | 2 | Number of Logical Cylinders | The Number of Logical Cylinders on the Mass Storage Device to be presented to the operating system. This number is Mass Storage Device Manufacture supplied. The firmware shall use this value to present the logical model to the operating system when LBA values are not used |
| 74–75 | 2 | Number of Logical Heads | The Number of Logical Heads on the Mass Storage Device to be presented to the operating system. This number is Mass Storage Device Manufacture supplied. The firmware shall use this value to present the logical model to the operating system when LBA values are not used |
| 76–77 | 2 | Number of Logical Sectors Per Track | The Number of Logical Sectors Per Track on the Mass Storage Device to be presented to the operating system. This number is Mass Storage Device Manufacture supplied. The firmware shall use this value to present the logical model to the operating system when LBA values are not used |
| 78–81 | 4 | Maximum User Area Logical Block Address | Maximum User Area Logical Block Address. This number represents the last valid logical block address on the drive. NOTE: This number is the maximum logical block address which is used on the drive. Logical block addresses start from 0 and count up. Therefore if this number were reported as 999, the actual number of available user sectors is 1000. |
| 82–83 | 2 | Number Internal Buffer Bytes | Number of Internal Data Buffer Bytes within the Mass Storage Device. |
| 84–91 | 8 | FW Revision Number | The firmware Revision Number. |
| 92–93 | 2 | Form Factor & Manufacture Device Type Code | The lower Byte of this code is the Form Factor code which describes the form factor of the current Mass Storage Device. This will be used to uniquely identify process related files and data to the current Mass Storage Device. Filenames shall be created using this fields data along with the Capacity number and HDA ID Code. The following form factor codes are defined: 'A' - 1.8" Type III Disk Drive 'B' - 1.8" Type II Disk Drive 'C' - 1.8" Type I Disk Drive 'D' - 2.5" * 12.5 mm high Disk Drive 'E' - 2.5" * 10 mm high Disk Drive |

-continued

| Offset | Size | Field Name | Description |
|---|---|---|---|
| | | | 'F' - 2.5" * 8 mm high Disk Drive |
| | | | 'G' - 3.0" * 1" high Disk Drive |
| | | | 'H' - 3.0" * 0.5" high Disk Drive |
| | | | 'I' - 3.5" full height Disk Drive |
| | | | 'J' - 3.5" 1" high Disk Drive |
| | | | 'K' - 3.5" 0.5" high Disk Drive |
| | | | 'L' - 5.25" full height Disk Drive |
| | | | 'M' - 5.25" half height Disk Drive |
| | | | All other Form Factor codes are reserved for future use. |
| | | | The upper Byte of this code is the Manufacture Device Type Code which is used to uniquely differentiate between Mass Storage Device with the same capacity and form factor. This code is Mass Storage Device Manufacturer defined and is only used for manufacturing process reporting purposes. |
| 94 | 1 | Defect Method Code | The Defects Method Code identifies to the firmware what type of low level format is being used by the Mass Storage Device firmware. |
| 95 | 1 | Defect Structure Code | The Defects Structure Code identifies to the firmware what data structure is being used to store defects in. See Section 4.1.3 for details of the defined Defect Structures and what Defect Structure Code has been assigned to each structure. |
| 96–97 | 2 | Read Channel & Servo Data Area Storage Size | The Read Channel & Servo Data Area Storage Size identifies to the firmware how much Host memory is required for storing the Mass Storage Device's Read Channel & Servo Data. The firmware will use this number to allocate memory and assign the address of that memory to the Mass Storage Device. This number is the number of BYTES of memory that is required by the Mass Storage Device to store its Read Channel & Servo Data. |
| 98–99 | 2 | Maximum Manufacturing Defects Data Area Storage Size | The Maximum Manufacturing Defects Data Area Storage Size identifies to the firmware how much Host memory is required for storing the Mass Storage Device's Manufacturing Defects Data. The firmware will use this number to allocate memory and assign the address of that memory to the Mass Storage Device. This number is the number of BYTES of memory that is required by the Mass Storage Device. to store its Manufacturing Defects Data. |
| 100–101 | 2 | Maximum Grown Defects Data Area Storage Size | The Maximum Grown Defects Data Area Storage Size identifies to the firmware how much Host memory is required for storing the Mass Storage Device's Grown Defect Data. The firmware will use this number to allocate memory and assign the address of that memory to the Mass Storage Device. This number is the number of BYTES of memory that is required by the Mass Storage Device to store its Grown Defects Data. |
| 102–125 | 24 | Reserved | Reserved for future data |
| 126–127 | 2 | Number of Zones | The number of Read / Write zones defined for the Mass Storage Device. |
| 128–up to 255 (128 + (# of zones * # of Bytes per Zone) − 1) | up to 128 bytes of data Actual = (# of zones * # of Bytes per Zone) | Zone Specific Data | The Zone Specific Data Array contains one structure entry for each zone. This structure provides support for up to 32 zones. Each zone contains 4 bytes of data. 4 bytes of data * 32 zones = 128 bytes maximum of zone data. |
| | 2 | First Cylinder of Zone | The first physical cylinder of the zone |
| | 2 | Number of Sectors Per Track | The total number of sectors per track in zone |

Figure 3:
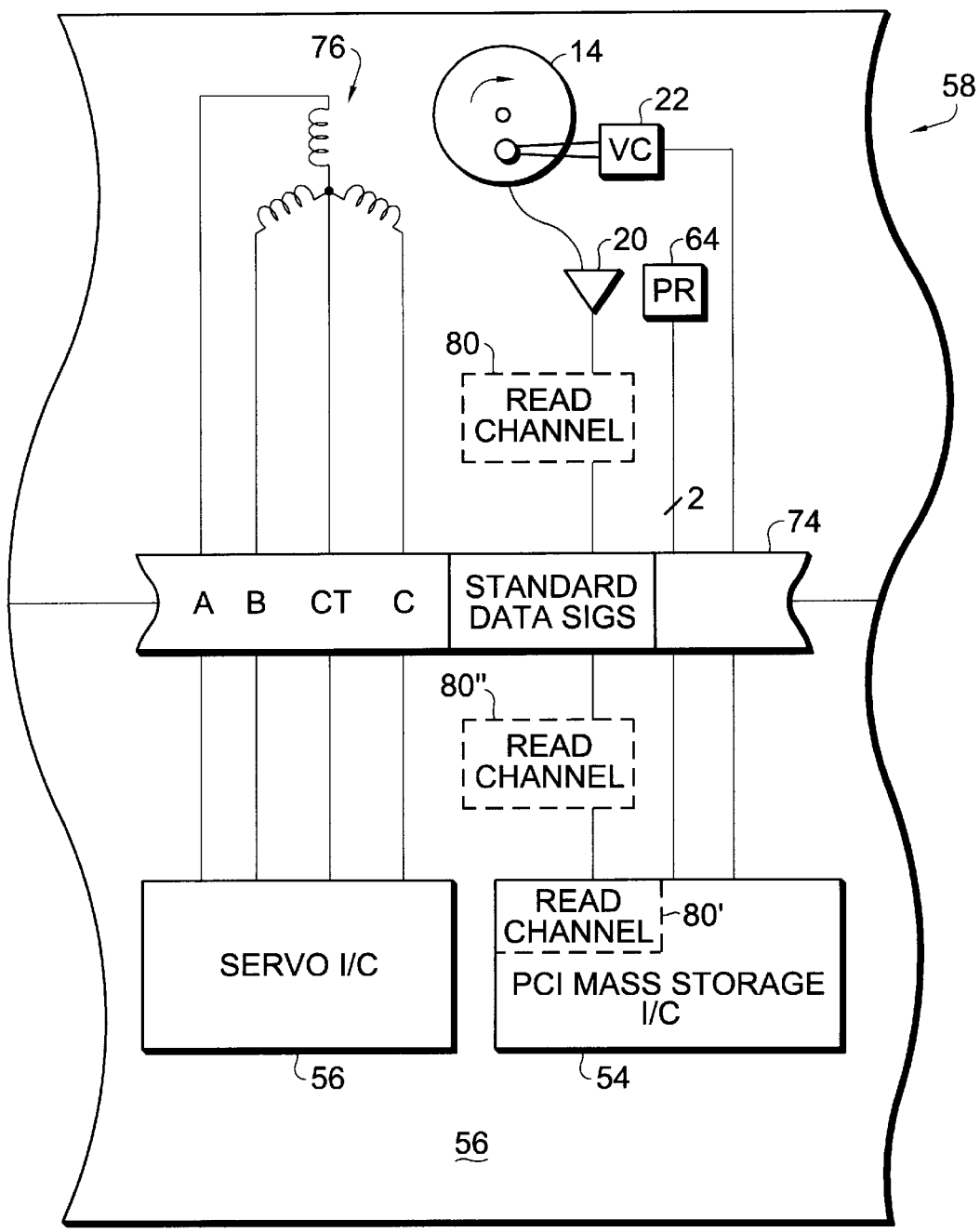
FIG. 3 is a block diagram of a portion of a computer system, showing an example of an interface between a mass storage peripheral device and a host computer, in accordance with a preferred embodiment of the invention.

A block diagram of a portion of a computer system, showing an example of an interface 74 between a mass storage peripheral device 58 and a motherboard 52 of a host computer, in accordance with a preferred embodiment of the invention, is shown in FIG. 3. Thus, the servo I/C 56 provides signal paths to coil terminals A, B, C, and CT of the motor windings 76 to spin and control the motor (not shown) of the mass storage peripheral device 58. It should be noted that the read channel circuitry 80, 80', and 80" is shown in dotted lines to illustrate the possible locations of the circuitry, depending upon the particular needs of the system and of the mass storage peripheral device. Thus, the read channel circuitry 80 may be entirely located in the mass storage peripheral device 58, or, alternatively, it may be located at the location 80' entirely within the PCI mass storage I/C 54. It also may be apportioned with one portion within the mass storage peripheral device 58 and another portion within the mass storage peripheral device 58. The read channel circuitry also may be located in a separate chip or integrated circuit at location 80" on the motherboard 52.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computer system for processing information in a read channel, comprising:
    a host computer having a first portion of said read channel;
    a mass storage peripheral device of the type having a computer readable medium, a sensor for detecting said information on said medium, a second portion of said read channel, and a data amplifier for amplifying said information detected on said medium to produce an amplified data signal;
    and an interface between said mass storage peripheral device and said host computer;
    wherein at least a controller circuit for said mass storage peripheral device is located in said host computer for receiving said information detected on said medium and processing said information by said first portion of said read channel.

2. The computer system of claim 1 wherein said controller circuit delivers said information onto a bus mastering bus in said host computer.

3. The computer system of claim 2 wherein said bus mastering bus is a PCI bus.

4. The computer system of claim 2 wherein said bus mastering bus is a 1394 bus.

5. The computer system of claim 1 wherein the mass storage peripheral device is a disk drive assembly.

6. The computer system of claim 1 wherein the mass storage peripheral device is a hard disk drive assembly.

7. The computer system of claim 1 wherein the mass storage peripheral device is a CD-ROM disk drive assembly.

8. The computer system of claim 1 wherein the mass storage peripheral device is a DVD disk drive assembly.

9. The computer system of claim 1 wherein the mass storage peripheral device is a floppy disk drive assembly.

10. The computer system of claim 1 wherein the mass storage peripheral device is a high capacity floppy disk drive assembly.

11. The computer system of claim 1 wherein the mass storage peripheral device is a miniature storage device.

12. The computer system of claim 1 wherein said mass storage peripheral device further comprises a motor for rotating said medium.

13. The computer system of claim 12 wherein said servo circuitry is located in said host computer and connected to said interface for operating said motor.

14. The computer system of claim 12 wherein said servo circuitry is located in said mass storage peripheral device and is connected to operate said motor.

15. The computer system of claim 12 wherein said servo circuitry is located partially in said host computer and partially in said mass storage peripheral device, and is connected to said interface for operating said motor.

16. The computer system of claim 1 wherein said mass storage peripheral device further comprises a positioning mechanism for positioning said sensor, and wherein said computer system further comprises a circuit located in said host computer and connected to said interface for operating said positioning mechanism.

17. A computer system for processing information in a read channel, comprising:
    a host computer having said read channel;
    a plurality of associated mass storage peripheral devices each of the type having a computer readable medium, a sensor for detecting information on said medium, and a data amplifier for amplifying said information detected on said medium to produce an amplified data signal;
    an interface between said mass storage peripheral devices and said host computer;
    and at least one controller circuit for said mass storage peripheral devices located in said host computer for receiving said information detected on said media of said devices for use in said computer and processing said information by said read channel.

18. The computer system of claim 17 wherein said at least one controller circuit comprises a plurality of controller circuits for respective associated ones of said plurality of mass storage peripheral devices.

19. The computer system of claim 17 wherein said at least one controller circuit delivers said information onto a bus mastering bus in said host computer.

20. The computer system of claim 19 wherein said bus mastering bus is a PCI bus.

21. The computer system of claim 19 wherein said bus mastering bus is a 1394 bus.

22. The computer system of claim 17 wherein at least one of the mass storage peripheral devices is a disk drive assembly.

23. The computer system of claim 17 wherein at least one of the mass storage peripheral devices is a hard disk drive assembly.

24. The computer system of claim 17 wherein at least one of the mass storage peripheral devices is a CD-ROM disk drive assembly.

25. The computer system of claim 17 wherein at least one of the mass storage peripheral devices is a DVD disk drive assembly.

26. The computer system of claim 17 wherein at least one of the mass storage peripheral devices is a floppy disk drive assembly.

27. The computer system of claim 17 wherein at least one of the mass storage peripheral devices is a high capacity floppy disk drive assembly.

28. The computer system of claim 17 wherein at least one of the mass storage peripheral devices is a miniature storage device.

29. The computer system of claim 17 wherein at least one of said mass storage peripheral devices further comprises a motor for rotating said medium, and wherein said host computer comprises servo circuitry connected to said interface for operating said motor.

30. The computer system of claim 17 wherein at least one of said mass storage peripheral devices further comprises a motor for rotating said medium and servo circuitry connected to operate said motor.

31. The computer system of claim 17 wherein at least one of said mass storage peripheral device comprises a motor for rotating said medium and wherein said computer system comprises servo circuitry located partially in said host computer and partially in said mass storage peripheral device for operating said motor.

32. The computer system of claim 17 wherein at least one of said mass storage peripheral devices further comprises a positioning mechanism for positioning said sensor, and wherein said host computer system further comprises a circuit connected to said interface for operating said positioning mechanism.

33. The computer system of claim 17 further comprising read channel circuitry connected to receive said amplified data signal.

34. A computer system, comprising:
- a mass storage peripheral device of the type having a rotatable computer readable data medium, a motor for rotating said medium, a sensor for detecting information on said medium, and a data amplifier for amplifying said information detected on said medium;
- a circuit board containing circuitry for controlling the operation of a computer;
- a controller circuit on said circuit board for receiving data signals from said data amplifier for use in said computer;
- an interface between said mass storage peripheral device and said controller circuit; and
- a servo circuit for driving said motor, said servo circuit being located on said circuit board.

35. The computer system of claim 34 wherein said controller circuit interfaces to a bus mastering bus in said host computer.

36. The computer system of claim 35 wherein said bus mastering bus is a PCI bus.

37. The computer system of claim 35 wherein said bus mastering bus is a 1394 bus.

38. The computer system of claim 34 wherein the mass storage peripheral device is a disk drive assembly.

39. The computer system of claim 34 wherein the mass storage peripheral device is a hard disk drive assembly.

40. The computer system of claim 34 wherein the mass storage peripheral device is a CD-ROM disk drive assembly.

41. The computer system of claim 34 wherein the mass storage peripheral device is a DVD disk drive assembly.

42. The computer system of claim 34 wherein the mass storage peripheral device is a floppy disk drive assembly.

43. The computer system of claim 34 wherein the mass storage peripheral device is a high capacity floppy disk drive assembly.

44. The computer system of claim 34 wherein the mass storage peripheral device is a miniature storage device.

45. The computer system of claim 34 wherein said mass storage peripheral device further comprises a positioning mechanism for positioning said sensor, and wherein said circuit board comprises a circuit connected to said interface for operating said positioning mechanism.

46. The computer system of claim 34 further comprising read channel circuitry connected to receive said amplified data signal.

47. The computer system of claim 46 wherein said read channel circuitry is contained on said circuit board.

48. The computer system of claim 46 wherein said read channel circuitry is contained in said mass storage peripheral device.

49. The computer system of claim 46 wherein said read channel circuitry is partially contained on said circuit board and partially contained in said mass storage peripheral device.

50. The computer system of claim 34 wherein said computer system if for use with an associated plurality of mass storage peripheral devices each of the type having a rotatable computer readable data medium and a motor for rotating said medium, further comprising a plurality of servo circuits, each for driving a respective one of said motors.

51. The computer system of claim 50 wherein said plurality of servo circuits is contained in a single integrated circuit chip on said circuit board.

* * * * *